Sept. 12, 1961   J. O. MELTON ET AL   2,999,709
BALL JOINT ASSEMBLY
Filed Sept. 12, 1960
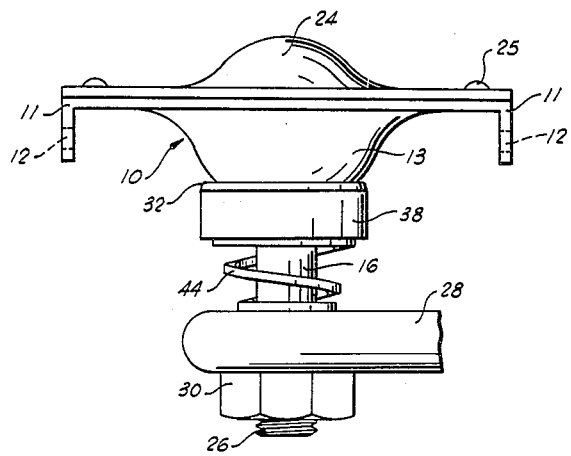
Fig. 1
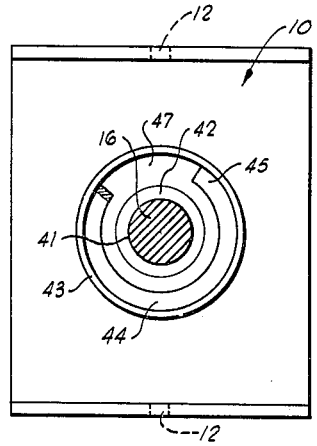
Fig. 3
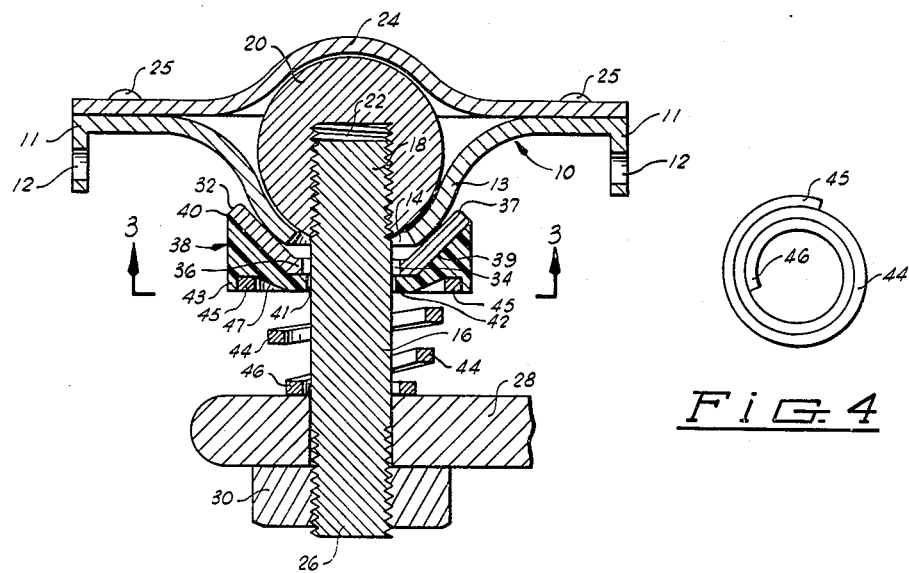
Fig. 2
Fig. 4
INVENTORS
JAMES O. MELTON &
BY THOMAS B. WILKINSON
*Jerry Julunly*
ATTORNEY

United States Patent Office

2,999,709
Patented Sept. 12, 1961

2,999,709
BALL JOINT ASSEMBLY
James O. Melton, Norman, and Thomas B. Wilkinson, Oklahoma City, Okla., assignors to Jamco, Inc., Oklahoma City, Okla., a corporation of Oklahoma
Filed Sept. 12, 1960, Ser. No. 55,300
1 Claim. (Cl. 287—90)

This invention relates to ball joint bearing assemblies, and more particularly, but not by way of limitation, to ball joint assemblies as applied to front suspension systems of automobiles. This application is a continuation-in-part of applicants' co-pending application entitled "Ball Joint Assembly," filed September 24, 1959, Serial No. 842,014.

Many automobiles, as manufactured today, use ball joint type bearings in the steering mechanisms and suspension systems of the front wheels to obtain improved riding and steering qualities. One example of the use of ball joint type bearings is in the pivotal coupling between the control arm and the steering knuckles of the automobile.

As it is well known in the art, the mating surfaces of the ball member and socket member of a ball joint assembly become worn through use and produce play and rattles in the assembly. Prior workers in the art have attempted to overcome such play and rattles by inserting a resilient member in the assembly which holds the ball member against one side of the socket member. Such a construction does reduce play and rattle, but also increases the friction in the assembly and does not reduce further wear caused by the entrance of foreign matter into the socket member—as occurs when the assembly is used in an automobile steering mechanism.

The present invention contemplates a novel ball joint assembly utilizing a spring around the stud extending from the ball member to urge the ball member against one side of the socket member to reduce play and rattle, and includes a novel bearing means between the spring and socket member to minimize the friction created by the force of the spring in the assembly. This invention also contemplates the use of a novel dished thrust washer to cooperate with the bearing means and the socket member to further reduce friction in the assembly and effectively seal the socket member from the entrance of foreign matter, such as dirt, mud, water, etc. The novel bearing means is specially shaped to receive and center the thrust washer with respect to the bearing means and to provide a seat for the spring.

It is an object of this invention to provide a ball joint assembly which will improve the steering performance of automobiles.

Another object of this invention is to provide a ball joint assembly which will maintain the ball in the ball joint body under tension, with a minimum of friction, assuring a bearing having less slack and play and yet providing a bearing which may be easily turned.

Another object of this invention is to provide a ball joint assembly which will prevent water, mud and dirt from entering the bearing system.

Another object of this invention is to provide a ball joint assembly which will not require adjustment after installation on the automobile.

A further object of this invention is to provide a ball joint assembly which is simple and economical to produce and which will have a long service life.

Other objects and advantages of the invention will be evident from the following detailed description, when read in conjunction with the accompanying drawings which illustrate our invention.

FIGURE 1 is a side elevation of a ball joint assembly constructed according to this invention.

FIGURE 2 is a vertical cross sectional view of the structure shown in FIG. 1.

FIGURE 3 is a sectional view taken along the lines 3—3 of FIG. 2.

FIGURE 4 is an end view of the spring.

Referring now to the drawings, the numeral 10 designates a body which has integrally formed mounting brackets 11 having bolt holes 12 to facilitate the mounting of the assembly to an automobile (not shown). The configuration of body 10 is such that a substantially hemispherical shaped socket portion 13 is provided. An opening 14 (FIG. 2) is provided in the center of the socket portion 13 to receive a stud 16. The opening 14 is larger than the stud 16 to allow substantial pivoting movement of the stud in any direction during operation of the ball joint assembly without the stud contacting the edges of the opening 14.

The inner end 18 of the stud 16 is rigidly secured to a ball member 20 in any suitable manner, such as by tightly threading the end 18 into a threaded bore 22 formed part way through the ball member 20. A dished cover 24 is rigidly secured over the open end of the body 10 in any desired manner, such as by spot welding 25, to complete the socket formed by the socket portion 13 of the body 10. It will be understood that the socket provided by the body portion 13 and the cover 24 is of a size to provide a tight sliding fit of the ball member 20 therein when the assembly is new. However, the cooperating surfaces of the ball member 20 and the socket, and particularly the inner surface of the socket portion 13, become worn during use to provide slack and rattle. The elimination of this slack and rattle is the primary purpose of this invention.

The outer end 26 of the stud 16 is suitably secured to a portion of the automobile steering mechanism, for example, a steering knuckle 28. One method of securing the stud 16 to the steering mechanism is by a nut 30 engaging threads on the outer end 26 of the stud.

A dished thrust washer 32 is positioned over the body socket portion 13 and has an axial opening 34 therethrough of a size to receive the stud 16 with only a slight clearance around the stud. The thrust washer 32 is tapered downwardly and inwardly towards its central axial opening 34 at an angle such that tangential contact is established with the socket portion 13. A flat, annular lip 36 defines the axial opening 34 through the thrust washer and extends normal to the stud 16. The upper, outer peripheral edge of the thrust washer is radiused as indicated by reference character 37 to assure that the thrust washer will move freely over the socket portion 13 when the stud 16 is shifted in the opening 14.

A bearing washer designated generally by reference character 38 is positioned around the stud 16 in contact with the thrust washer 32. The bearing washer 38 has a dished upper surface 39 which is tapered downwardly and inwardly from the upper peripheral edge 40 of the washer toward the central aperture 41 thereof. The central aperture 41 is surrounded by a flat, annular lip 42 of the bearing washer 38, which lip extends normal to the stud 16. The configuration of the bearing washer 38 is complementary to that of the thrust washer 32 so that a bearing surface exists between the two washers when they are in contact. It will be noted, in referring to FIG. 2, that the aperture 41 through the bearing washer 38 is of smaller diameter than the opening 34 in the thrust washer 32. This arrangement permits the bearing washer to form a grease seal with the stud 16 and to pivot with the stud relatively to the thrust washer 32 which tends to remain fixed with respect to the socket portion 13. The lower surface 47 of the bearing washer 38 is convexly shaped and slopes outwardly and upwardly from the central aperture 41 thereof. The bearing washer 38 is further characterized in having a downwardly extending peripheral flange 43.

The flange 43 and convex lower surface 42 of the bearing washer 38 form together a seat and guide for a helical spring 44 which is compressibly positioned around the stud 16 between the bearing washer and the steering knuckle 28. The spring 44 is specially constructed of a relatively wide spring material as shown in FIG. 4. This construction provides relatively large flat contact areas 45 and 46 to engage the steering knuckle 28 and the bearing washer 38, respectively, thereby eliminating the necessity of a supporting washer between components.

The operation and function of the ball joint assembly will now be described. The widespread application of the ball joint bearing system is primarily due to the omnidirectional pivotation ability. The steering knuckle 28 pivots with reference to the body 10, causing the ball 20 to turn within the confines of the body 10 and the cover 24 within the limitation of the opening 14. As the stud 16 pivots, the thrust washer 32 is constrained to move with it. Since the thrust washer 32 contacts the substantially hemispherical surface of the socket portion 13 of the ball joint body 10, the opening 14 of the ball joint body 10 is completely covered at all times, precluding the entrance of water, mud or dirt into the bearing mechanism.

As the steering knuckle 28 rotates in a plane at a right angle to the stud 16, a bearing surface exists between the bearing washer 38 and the thrust washer 32. The bearing washer 38 is composed of a high density synthetic resin having inherently lubricous surfaces, such as polymerized olefins characterized by the fact that their unsaturation is preponderantly of the trans-internal or terminal vinyl type as polymerized according to U.S. Patent No. 2,825,721. One of the novel elements of this invention includes a low friction bearing surface, completely independent of any external lubrication requirements, between the thrust washer bearing area 37 and the bearing washer 38.

Some of the synthetic resin materials which have proven satisfactory for use in the construction of the bearing washer 38 include: polymerized olefins such as sold under the trade name "Marlex," polymerized tetrafluoroethylene, such as sold under the trade name "Teflon," and long-chain synthetic polymeric amides, such as sold under the trade name "Nylon."

The spring 44 exerts a continuous compressive force between the steering knuckle 28 and the bearing washer 38. This compressive force serves to pull the ball member 20 towards the socket portion 13 of the body 10 at all times. This constraining action prevents any loose fit which develops between the ball 20 and the cover 24 or the body 10, since the ball 20 will be pulled into the substantially hemispherical shaped socket portion 13 of the body 10 during operation of the bearing assembly. This action serves to minimize slack and play in the bearing assembly, which may tend to develop due to wear. The spring 44 serves to automatically adjust for any wear which does develop, eliminating the requirement for adjustment of the ball joint assembly after installation.

The external area of the socket portion 13 of the body 10 is of substantial hemispherical configuration, but is modified towards its outward extremity to form the necessary mounting brackets 11. The configuration of the thrust washer 32 provides a minimum of interference with the portion 13 as the ball 20 is moved.

For illustrative purposes, this invention has been described as it particularly relates to automobile steering mechanism assemblies. It is apparent that the principles of this invention may be adapted to any ball joint type bearing mechanism used to connect two relatively movable members, whether used in automobile assemblies or otherwise.

Although this invention has been described with a certain degree of particularity, it is manifest that many changes may be made in the details of construction and arrangement, without departing from the spirit and scope of the invention as set forth in the appended claim.

We claim:

In a ball joint assembly for pivotally interconnecting two members, comprising a body having a spherically shaped socket portion and adapted for connection with one of said members, said socket portion having an axial opening therein, a ball member fitting in said spherically shaped socket portion, a stud secured to said ball member and extending through said axial opening, said stud being of a size to extend loosely through said axial opening and being adapted for connection with the other of said members in spaced relation from said body, the improvement which comprises a dished thrust washer around said stud adjacent said body and having wall portions inclined to bear tangentially against said spherically shaped socket portion, said thrust washer further having a central aperture therein of smaller diameter than said axial opening to partially seal said axial opening, and having a flat annular lip surrounding said central aperture; high density, synthetic resin bearing means around said stud between said dished thrust washer and said other member; and a spring around said stud compressively retained between said bearing means and said other member to constantly urge said ball member into engagement with said socket portion, said bearing means having a dished surface complementary in configuration to said thrust washer and mating therewith to form a bearing, and said bearing means further having a convexly shaped surface opposite said dished surface and a peripheral flange extending parallel to said stud toward said other member, said flange forming a guide for said spring, and said flange and said opposite surface providing a seat for said spring.

References Cited in the file of this patent

UNITED STATES PATENTS

| | | |
|---|---|---|
| 1,452,530 | Sherbondy | Apr. 24, 1923 |
| 2,456,546 | Venditty | Dec. 14, 1948 |
| 2,690,360 | Young | Sept. 28, 1954 |

FOREIGN PATENTS

| | | |
|---|---|---|
| 522,065 | Canada | Feb. 21, 1956 |